United States Patent [19]
Antony et al.

[11] Patent Number: 5,613,795
[45] Date of Patent: Mar. 25, 1997

[54] CONICAL CONNECTING DEVICE FOR CONNECTING MACHINE COMPONENTS

[75] Inventors: Gerhard Antony; William Lechler, both of Virginia Beach, Va.

[73] Assignee: Sumitomo Machinery Corp. of America, Chesapeake, Va.

[21] Appl. No.: 609,018

[22] Filed: Feb. 29, 1996

[51] Int. Cl.⁶ ........................................ F16B 2/14
[52] U.S. Cl. .......................... 403/370; 403/367
[58] Field of Search ................... 403/371, 370, 403/367

[56] References Cited

U.S. PATENT DOCUMENTS

| | | |
|---|---|---|
| 2,434,152 | 1/1948 | Forry . |
| 2,764,437 | 9/1956 | Bratt . |
| 2,819,090 | 1/1958 | Stenberg . |
| 3,049,368 | 8/1962 | Jansen . |
| 3,460,300 | 8/1969 | Howlett . |
| 3,816,013 | 6/1974 | Schuhmann . |
| 4,343,565 | 8/1982 | Hallerbäck . |
| 4,362,411 | 12/1982 | Åsberg . |
| 4,407,603 | 10/1983 | Lundgren . |
| 4,411,551 | 10/1983 | Adelbratt . |
| 4,452,547 | 6/1984 | Thiel et al. . |
| 4,460,289 | 7/1984 | Lundgren . |
| 4,461,592 | 7/1984 | Adelbratt . |
| 4,464,140 | 8/1984 | Lundgren . |
| 4,598,443 | 7/1986 | Östling et al. . |
| 4,600,334 | 7/1986 | Soussloff . |
| 4,626,114 | 12/1986 | Phillips . |
| 4,824,277 | 4/1989 | Adolfsson . |
| 4,973,186 | 11/1990 | Adolfsson . |
| 5,044,817 | 9/1991 | Rayner et al. . |

FOREIGN PATENT DOCUMENTS

| | | |
|---|---|---|
| 0377492B1 | 11/1990 | European Pat. Off. . |
| 2084293 | 4/1982 | United Kingdom . |
| 2137312 | 10/1984 | United Kingdom . |
| WO88/09444 | 12/1988 | WIPO . |

*Primary Examiner*—Anthony Knight
*Attorney, Agent, or Firm*—Richard Linn

[57] ABSTRACT

An internal conical connecting device for connecting machine components comprising an inner bushing with a first set of parallel conical grooves, and an outer bushing with a corresponding second set of parallel conical grooves. The first and second sets of parallel conical grooves are engageable for wedging a hub into locking connection with a shaft upon axial movement of the outer bushing relative to the inner bushing. The first and second sets of parallel conical grooves have symmetrical segments removed to facilitate assembly and disassembly of the connecting device. A flat ring or integral flange is fixed to the inner bushing, and threaded members extend between the flat ring and the outer bushing. The flat ring and the threaded members are used to axially displace the inner and outer bushings relative to each other and generate a strong normal force for clamping and supporting the connected hub on the shaft. The inner and outer bushings have an axial split for reducing stiffness and allowing the bushings to bridge a larger gap. The outer bushing can be a separate component, or integral with a hollow output shaft of a shaft mounted gear reducer.

16 Claims, 3 Drawing Sheets

CONICAL CONNECTING DEVICE FOR CONNECTING MACHINE COMPONENTS

BACKGROUND OF THE INVENTION

1. Field of the Invention

The present invention belongs to the group of friction type devices for connecting of hubs with shafts. The invention is applicable for connecting of a wide range of machine components for rotary motion transfer, such as shafts, wheels, gears, pulleys, Couplings, bearings, and so forth.

2. Description of the Related Art

Machine components for transferring rotary motion, such as shafts, wheels, gears, pulleys, couplings, and so forth, are the basic elements of virtually every machine. A reliable connection of an external cylindrical surface of a machine component (e.g., a shaft) with an internal cylindrical surface of another machine component (e.g., a bore of a hub) is essential for proper functioning and servicing of the machinery.

A removable and reusable shaft/hub connection device should fulfill three basic functions. First, the device should reliably secure the desired position of the connected components. Second, the device must be able to transfer forces from one element to the other. Third, the device should permit easy assembly and disassembly of the components.

Friction type shaft/hub connecting devices function by creating pressure (normal forces) between the bore of the hub and the shaft, which results in a friction force. The generated friction force is proportional to the applied pressure and the friction coefficient between the surfaces in contact. There are a number of ways to create contact pressure between the hub and shaft. A commonly used method is to utilize the wedging action of an inner and an outer cone. An inner and an outer cone forced together in an axial direction generate a normal force between the surfaces in contact and cause an expansion of the outer cone and a compression of the inner cone. The magnitude of the normal force is directly proportional to the applied axial force and inversely proportional with the sinus of the wedge angle.

The simplest arrangement to utilize this wedging action for a shaft/hub connection is to shape the shaft and the bore of the hub as a cone. This frequently used method has the disadvantage that the hub and the shaft must have precisely machined matching conical surfaces. The standard requirement is generally to connect a cylindrical hub with a cylindrical shaft.

A number of conical shaft/hub locking devices have been previously developed to lock cylindrical shafts and hubs. There are two principle types of arrangements of these devices, which will be referred to as external and internal types. The external type has an external cone arrangement that clamps a thin wall extension of the hub by elastically deforming and compressing the hub to the shaft. The internal types are inserted into the bore of the hub bridging the gap between the shaft and bore and clamping by a wedging action of the inserted conical arrangement.

Many of the existing conical shaft/hub locking devices, such as the popular conical shrink disks or conical compression rings, do not provide sufficient support and accurate positioning. Additional measures, such as cylindrical centering surfaces or centering inserts manufactured to tight tolerances, are needed in these devices to avoid an excessive radial and axial runout of the connected components. Moreover, a long supporting base is usually required next to the centering surfaces to provide a strong and rigid support for the component (i.e., the gear, wheel, etc.) on the shaft.

There are a number of conical shaft hub locking devices having a spiral, thread type arrangement of grooves to make an assembly possible. Such locking devices are disclosed, for example, in U.S. Pat. Nos. 2,434,152, 2,819,090, 4,407, 603, 4,464,140, 4,461,592, 4,460,289, and 5,044,817, and European Patent Publication No. EP 0 377 492 B1. The grooves of these patented devices comprise threads with a triangular thread profile. The assembly and disassembly process consists of screwing the inner bushing into the outer bushing.

SUMMARY OF THE INVENTION

It is an object of the present invention to provide an improved device for connecting machine components that overcomes the problems of the existing locking devices described above.

It is a further object of the present invention to provide a removable and reusable shaft/hub connection device that reliably secures machine components in a desired position, transfers forces from one element to another, and permits easy assembly and disassembly of the machine components.

Additional objects, advantages, and novel features of the invention will be set forth in the following description, and will become apparent to those skilled in the art upon reading this description or practicing the invention. The objects and advantages of the invention may be realized and attained by the appended claims.

To achieve the foregoing and other objects and in accordance with the purpose of the present invention, as embodied and broadly described herein, the internal conical connecting device of the present invention comprises an inner bushing having an outer surface with a first set of parallel conical grooves, and an outer bushing having an inner surface with a second set of parallel conical grooves, the first and second sets of parallel conical grooves being engageable for wedging a hub into locking connection with a shaft upon axial movement of the outer bushing relative to the inner bushing.

In a preferred embodiment, the first and second sets of parallel conical grooves have symmetrical segments removed to facilitate assembly and disassembly of the connecting device. An axial slot is defined between the inner and outer bushings by the removed symmetrical segments, and a securing insert may be applied into the axial slot to keep the inner and outer bushings from separating before the inner and outer bushings are mounted and pretensioned.

A flat ring or integral flange is fixed to the inner bushing, and threaded members extend between the flat ring and the outer bushing. The flat ring and the threaded members provide means for axially displacing and pretensioning the inner and outer bushings against each other and generating a strong normal force for clamping and supporting a connected hub on the shaft.

The inner and outer bushings have an axial split for reducing stiffness and allowing the bushings to bridge a larger gap. The outer bushing can be a separate component, or integral with a hollow output shaft of a shaft mounted gear reducer.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

The present invention is an internal type conical shaft/hub locking device for connecting machine components, and particularly for locking shafts and hubs.

Figure 1:
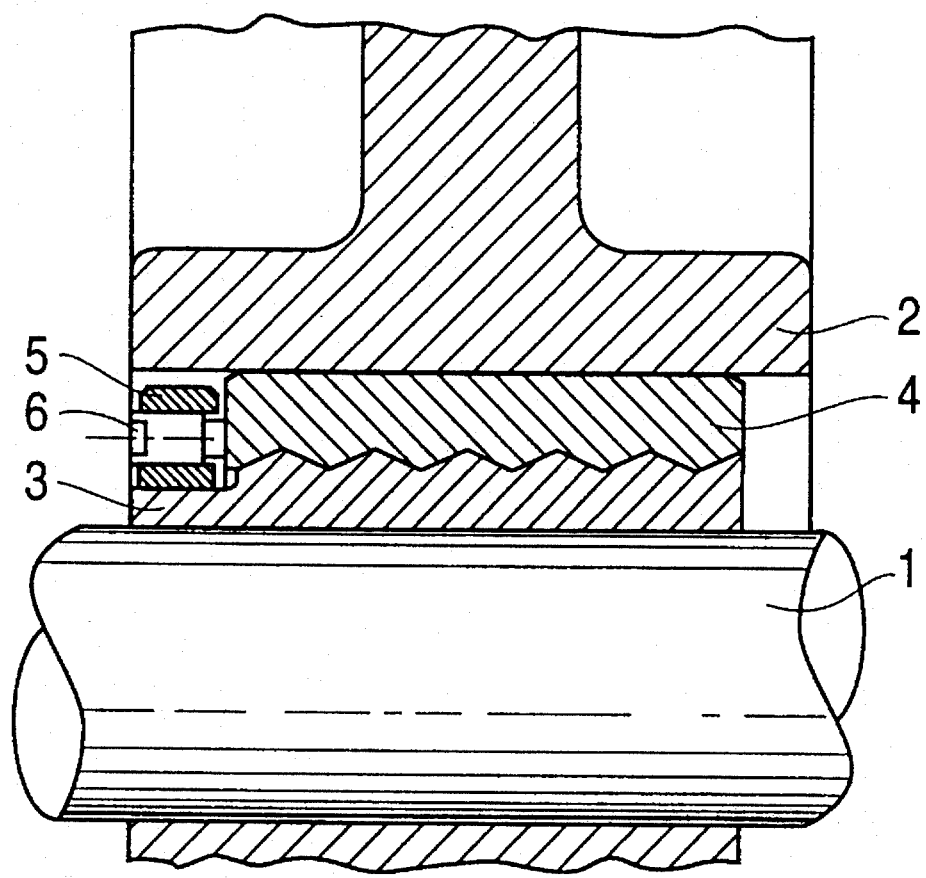
FIG. 1 is a cross-sectional side view of a shaft/hub connecting device according to the present invention.

A preferred embodiment of the present invention will be described in detail hereinafter with reference to FIGS. 1 to 4. The invention depicted in FIG. 1 provides all three objectives of a removable and reusable shaft/hub connection device, as listed above, and is particularly suitable for connecting components that require a long supporting base. Instead of using long conical inserts, which require a large hub bore diameter, insert bushings 3 and 4 are provided with a series of conical grooves 36, 46 respectively.

The inner bushing 3 has a cylindrical bore 3B that is slightly larger than the connected shaft 1, and an outer surface with a set of conical grooves 3G. One end of the inner bushing 3 is shaped in such a way that a flat ring 5 can be attached and axially fixed. The attachment can be accomplished by using a threaded connection 5T between the flat ring 5 and the inner bushing 3, as shown in FIG. 1. The attachment can also be made using a snap ring, pins or even welding. The flat ring 5 can also be an integrated flange formed as part of the inner bushing 3.

The bore of the outer bushing 4 has conical grooves 4G of identical geometry to the grooves 3G on the inner bushing 3. The cylindrical outer surface 4C of the outer bushing 4 is slightly smaller than a bore 2B of the hub 2 to make the assembly easier.

A set of evenly distributed bolts 6 located in the threaded holes of the ring 5 provides a means for axially moving the inner bushing 3 against the outer bushing 4. Upon tightening of the bolts 6, the bushings 3 and 4 are pretensioned as a result of the normal forces generated on the wedges of the conical grooves 3G, 4G. As a result, the outer bushing 4 is expanded and the inner busing 3 is compressed, whereby the hub 2 is clamped securely to the shaft 1 with a high force.

Figure 2:
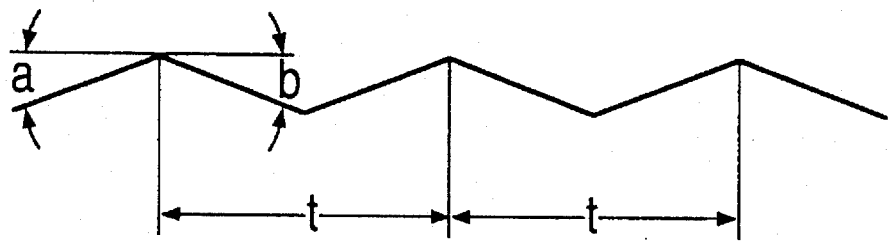
FIG. 2 is a diagrammatic illustration of the conical grooves on the inner and outer bushings of the shaft/hub connecting device shown in FIG. 1.
Figure 3:
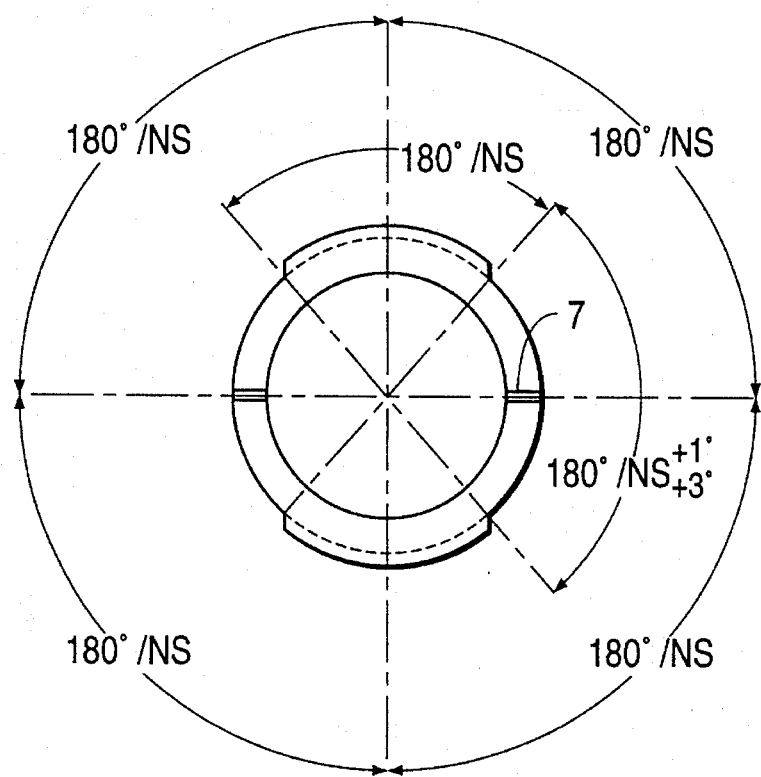
FIG. 3 is cross-sectional end view of the inner bushing of the shaft/hub connecting device shown in FIG. 1.

The conical grooves 3G, 4G on the inner and outer bushings 3 and 4, as shown in FIG. 2, are evenly spaced along the length of the bushings 3 and 4 a spacing "t". The cone angles "a" and "b" are preferably somewhat larger than the friction angle (i.e., arctan(f), where f=friction coefficient) to make disassembly of the device easier. A symmetrical groove profile where the angle "a" is the same as the angle "b" is preferable.

The present invention also provides an easy, user friendly means for assembling the inner and outer bushings 3 and 4, which have parallel conical grooves, into the shaft/hub locking arrangement shown in FIG. 1. Specifically, as shown in the cross-sectional end view of the inner bushing 3 depicted in FIG. 3, segments of the grooves 3G of the inner bushing 3 are removed. The removed segment angle is preferably 180/NS +1 to 3 degrees, where NS is the number of the removed segments. The spacing of the removed segments is 180/NS.

Figure 4:
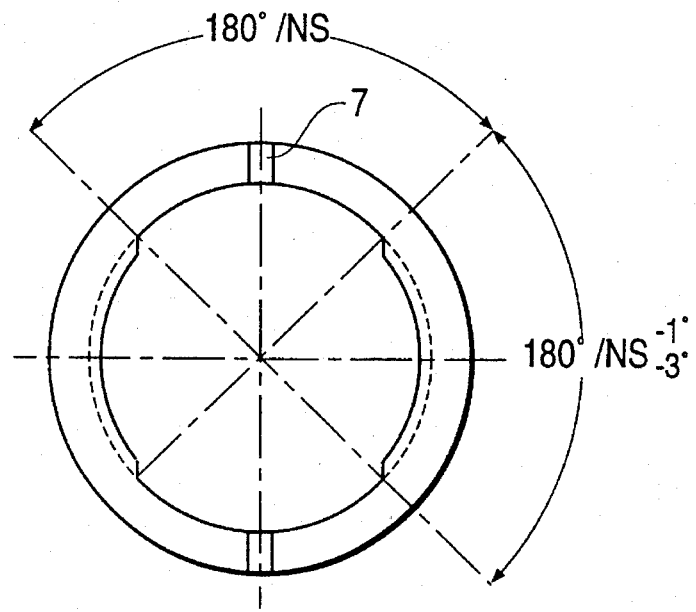
FIG. 4 is a cross-sectional end view of the outer bushing of the shaft/hub connecting device shown in FIG. 1.

Corresponding segments of the conical grooves 4G are removed from the external bushing 4, as shown in the cross-sectional end view of the bushing 4 depicted in FIG. 4. The removed segments in the inner and outer bushings 3 and 4 permit easy assembly of the bushings 3 and 4 by inserting the inner bushing 3 into the outer bushing 4, and by subsequently turning the bushings 3 and 4 relative to one another by 180/NS degrees to bring the conical surfaces of the grooves 3G and 4G into engagement.

The minimum number of segments "NS min" is preferably two to have a symmetric arrangement that provides a good centering function. Of course, the theoretical number of segments can be any integer number.

The inner and outer bushings 3 and 4 preferably have a split 7 along an axial length thereof. The split 7 greatly reduces the radial stiffness of the bushing assembly, which allows the bushing assembly to bridge larger gaps (i.e., to be used with shafts/hubs having larger tolerances) and generate higher clamping forces than is possible with the same geometry bushings without a split.

As will be appreciated from the above description, the present invention does not use a threaded arrangement of the conical grooves. Rather, the invention uses parallel, conical grooves 3G, 4G that are perpendicular to the axis of rotation of the bushings 3 and 4. This arrangement permits manufacture of the bushings 3 and 4 by a simple, fast machining on universal turning machines. Cam type form tools can be used to machine the grooves 3G, 4G very efficiently in one pass.

A further advantage of the present invention is the fast and easy assembly. Specifically, the connecting device can be assembled by simply inserting the inner bushing 3 in an axial direction into the outer bushing 4, and turning the inner bushing 3 with respect to the outer bushing 4 by 180/NS degrees. In contrast, existing locking devices that use threaded grooves require multiple turns to screw the assembly together. This feature of the present invention is also beneficial when disassembling the shaft/hub connection after long usage.

Figure 5:
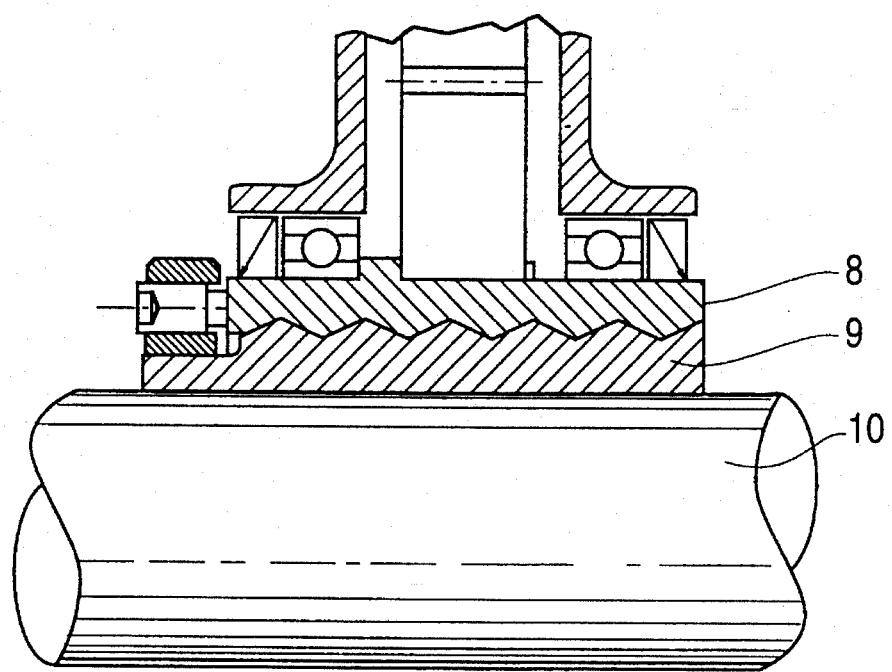
FIG. 5 is a cross-sectional side view of a shaft/hub connecting device according to the present invention being used to connect a hollow output shaft of a speed reducer to a shaft.

The present invention also can be used to connect shaft-mounted speed reducers (i.e., hollow output shaft gearboxes) with a solid shaft of a machine (i.e., a customer shaft). As shown in FIG. 5, a hollow output shaft 8 of a shaft-mounted speed reducer 8R and an outer bushing of the connecting device of the present invention are an integrated part in this arrangement. The inner bushing 9 is essentially identical to the inner bushing 3 described above with reference to FIGS. 1 and 3.

The arrangement shown in FIG. 5 permits a keyless, flexible attachment of a hollow shaft gearbox 8R to a customer shaft 10. The inner bushing 9 can be easily adapted to the diameter of a particular customer shaft 10 in a machining operation by keeping non-split inner bushing blanks in stock and boring the blanks to make the inner bushings 9 suitable to the particular diameter of the shaft 10.

Figure 6:
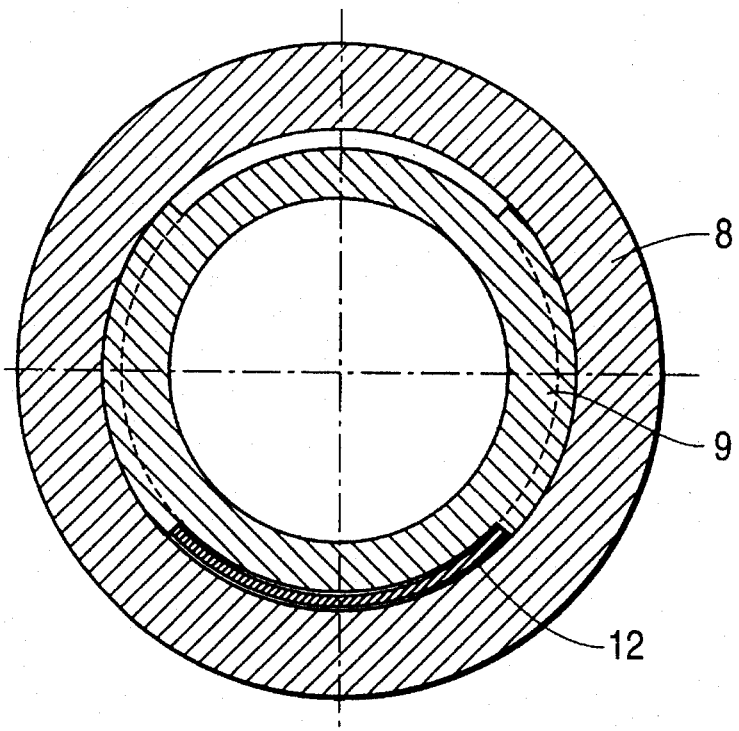
FIG. 6 is a cross-sectional end view of the shaft/hub connecting device shown in FIG. 5, in conjunction with a separation preventing insert.

Before the connection is pretensioned, or before the shaft 10 is in place, such as prior to or during assembly, the inner and outer bushings 8 and 9 can be disengaged and separated by turning 180/NS degrees. If separation of the inner and outer bushings 8 and 9 is undesirable, it can be avoided by inserting a simple plastic or metal insert 12 into the axial slots between the inner and outer bushings 8 and 9. FIG. 6 shows a cross-sectional end view of the assembled inner bushing 9 and outer bushing 8 with the insert 12 in place for preventing separation of the inner and outer bushings 8 and 9.

It will be appreciated that the present invention is not limited to the exact construction described above and illustrated in the accompanying drawings, and that various modifications and changes can be made without departing from the scope of the invention. It is intended that the scope of the invention be limited only by the appended claims.

What is claimed is:

1. An internal conical connecting device for connecting machine components, comprising:

an inner bushing having an outer surface with a first set of parallel conical grooves; and an outer bushing having an inner surface with a second set of parallel conical grooves;

said first and second sets of parallel conical grooves being engageable for wedging a first machine component into locking connection with a second machine component upon axial movement of said outer bushing relative to said inner bushing.

2. The connecting device as set forth in claim 1, wherein said first and second sets of parallel conical grooves have symmetrical segments removed to facilitate assembly and disassembly of the connecting device.

3. The connecting device as set forth in claim 2, wherein an axial slot is defined between the inner and outer bushings by said removed symmetrical segments, and further comprising a securing insert applied into said axial slot to keep the inner and outer bushings from separating before the inner and outer bushings are mounted and pretensioned.

4. The connecting device as set forth in claim 1, further comprising a flat ring or integral flange fixed to said inner bushing, and threaded members extending between said flat ring and said outer bushing, said flat ring and said threaded members providing means for axially displacing and pretensioning the inner and outer bushings against each other and generating a strong normal force for clamping and supporting a connected hub on a shaft.

5. The connecting device as set forth in claim 1, wherein said inner bushing has an axial split for reducing stiffness and allowing the inner bushing to bridge a larger gap.

6. The connecting device as set forth in claim 1, wherein said outer bushing has an axial split for reducing stiffness and allowing the outer bushing to bridge a larger gap.

7. The connecting device as set forth in claim 1, wherein said outer bushing is integral with a hollow output shaft of a shaft mounted gear reducer.

8. A device for connecting a shaft to a hub, comprising:

an inner bushing having an inner surface in engagement with a shaft and an outer surface with a first set of parallel conical grooves that are perpendicular to a central longitudinal axis of the inner bushing;

an outer bushing having an outer surface in engagement with a hub and an inner surface with a second set of parallel conical grooves, said second set of parallel conical grooves engaging said first set of parallel conical grooves; and means for moving said inner bushing axially relative to said outer bushing for causing said first and second sets of parallel conical grooves to generate a strong normal force between the inner bushing and the shaft and between the outer bushing and the hub, respectively, for locking the hub to the shaft.

9. The connecting device as set forth in claim 8, wherein said first and second sets of parallel conical grooves have symmetrical segments removed to facilitate assembly and disassembly of the connecting device.

10. The connecting device as set forth in claim 9, wherein an axial slot is defined between the inner and outer bushings by said removed symmetrical segments, and further comprising a securing insert applied into said axial slot to keep the inner and outer bushings from separating before the inner and outer bushings are mounted and pretensioned.

11. The connecting device as set forth in claim 8, wherein said moving means comprises a flat ring or integral flange fixed to said inner bushing, and threaded members extending between said flat ring and said outer bushing.

12. The connecting device as set forth in claim 8, wherein said inner and outer bushings each has an axial split for reducing stiffness and allowing the connecting device to bridge a larger gap.

13. A device for mounting a speed reducer to a shaft, comprising:

an inner bushing having an inner surface in engagement with a first shaft and an outer surface with a first set of parallel conical grooves;

a speed reducer having a second hollow output shaft, said second hollow output shaft having an inner surface with a second set of parallel conical grooves, said second set of parallel conical grooves engaging said first set of parallel conical grooves; and means for moving said inner bushing axially relative to said second hollow output shaft for causing said first and second sets of parallel conical grooves to generate a strong normal force between the inner bushing and the first shaft for locking the second hollow output shaft to the first shaft.

14. The device as set forth in claim 13, wherein said first and second sets of parallel conical grooves have symmetrical segments removed to facilitate assembly and disassembly of the device.

15. The device as set forth in claim 14, wherein an axial slot is defined between the inner bushing and the second hollow output shaft by said removed symmetrical segments, and further comprising a securing insert applied into said axial slot to keep the inner bushing and the second hollow output shaft from separating before the inner bushing is mounted on the first shaft.

16. The connecting device as set forth in claim 13, wherein said moving means comprises a flat ring or integral flange fixed to said inner bushing, and threaded members extending between said flat ring and said second hollow output shaft.

* * * * *